United States Patent

[15] 3,646,430

Hearn

[45] Feb. 29, 1972

[54] OPTICALLY PUMPED MAGNETOMETER INCLUDING CIRCUITS FOR ENERGIZING THE RADIATION SOURCE AND THE ABSORPTION CELL

[72] Inventor: Daniel P. Hearn, Tulsa, Okla.

[73] Assignee: Atlantic Richfield Company, New York, N.Y.

[22] Filed: Oct. 15, 1968

[21] Appl. No.: 767,657

[52] U.S. Cl. ............................................324/0.5, 315/248
[51] Int. Cl. ..........................................................G01r 33/08
[58] Field of Search ..................324/0.5; 315/248; 331/3, 94

[56] References Cited

UNITED STATES PATENTS 3,109,960   11/1963   Bell..........................................315/248
3,387,207   6/1968    Vessot.....................................324/0.5

OTHER PUBLICATIONS

L. D. Schearer– Production of Very Stable Magnetic Fields in the Range 0– 50 Sauss Rev. of Sci. Instr.– 32(11)– November 1961, pp. 1190– 1192.

*Primary Examiner*—Michael J. Lynch
*Attorney*—John W. Behringer, Eugene L. Bernard, Martin J. Brown, James N. Dresser, W. Brown Morton, Jr., Robert T. Roberts, Malcolm L. Sutherland and Robert E. Lee, Jr.

[57] ABSTRACT

An optically pumped magnetometer comprising a radiation source including a radiation lamp, a radiation absorption cell on one side of the radiation source, a radiation detector, means for subjecting the absorption cell to a high-frequency magnetic field, first coupling means having a first resonant frequency for coupling the absorption cell to a high-frequency source, second coupling means having a second, variable resonant frequency for coupling the radiation source to the high-frequency source, a radiation reflector on the side of the lamp opposite the absorption cell to reflect to the cell radiation initially radiated away from the cell, and a heat sink for the radiation source.

11 Claims, 6 Drawing Figures

PATENTED FEB 29 1972 3,646,430

INVENTOR
DANIEL P. HEARN

BY McLean, Morton & Boustead
ATTORNEYS

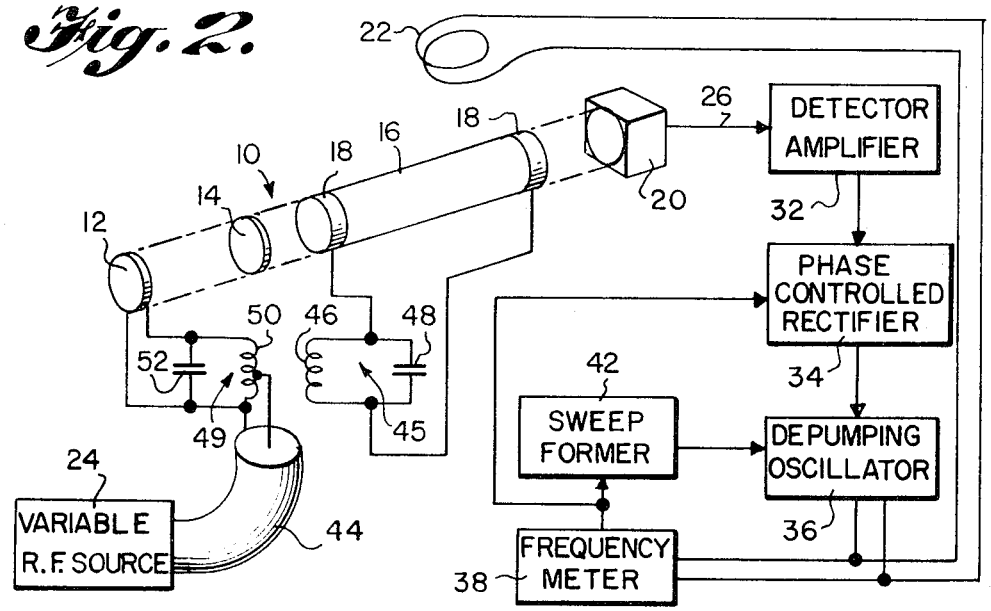
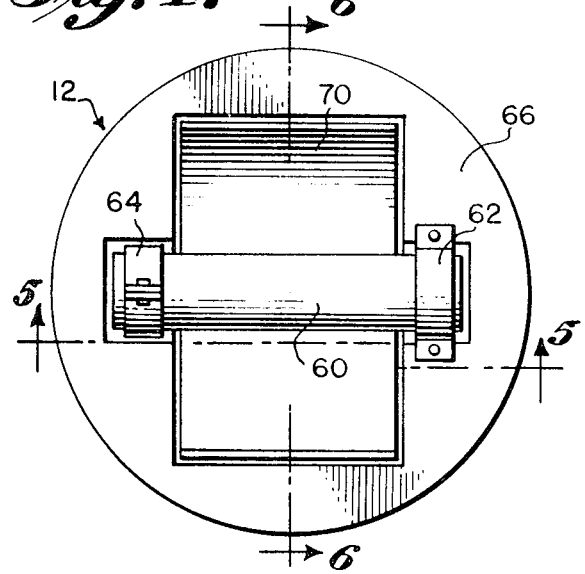
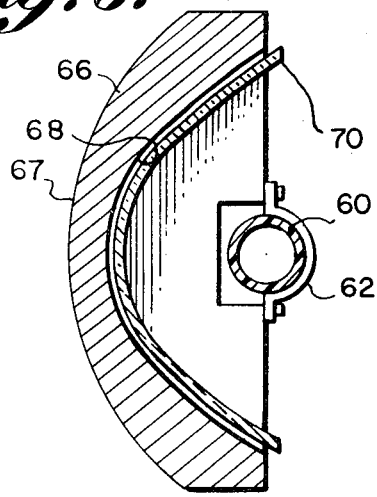
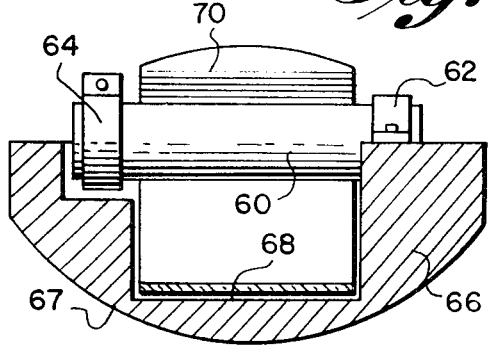
INVENTOR
DANIEL P. HEARN
BY McLean, Morton & Boustead
ATTORNEYS

OPTICALLY PUMPED MAGNETOMETER INCLUDING CIRCUITS FOR ENERGIZING THE RADIATION SOURCE AND THE ABSORPTION CELL

This invention relates to an improvement in optical magnetometers. More particularly, the present invention relates to an optical magnetometer including means for permitting operation of the radiation source and the absorption cell at optimum frequency, while starting the radiation source at the optimum firing frequency, and including means for directing substantially all the radiation from the source through the absorption cell without use of lenses, and further including a heat sink for the radiation source.

The recent advent of high-sensitivity optical absorption magnetometers to measure minute fluctuations in the intensity of the earth's magnetic field has greatly expanded the ability of geophysical prospectors to locate and identify subterranean deposits of oil and precious metals. Furthermore, the precision of magnetic field detection by optical absorption magnetometers is so exact that such magnetometers permit airborne exploration of uncharted terrain, thereby greatly increasing both the speed of geophysical exploration and the ability of prospectors to reach remote and inaccessible terrain for geophysical examination.

The optical absorption magnetometer used in the system of this invention can be any one of the family of spin precision magnetometers, e.g., the proton precision magnetometer, the alkali-vapor, rubidium, and cesium instruments, or, preferably the metastable helium magnetometer. The operation of such magnetometers is dependent upon the quantized nature of the absorption and radiation of energy of the atom. The "planetary" electrons of any atom can exist only in certain specific energy levels. In their lowest or ground state the electrons are stable. However, the electrons can be excited to certain specific higher energy states by supplying to the system the exact quantity of energy equal to the difference between the higher and the original state. The electron can exist at the higher state for a time which is determined by statistical considerations. As the excited electron returns to a "permissible" lower state the atom radiates an amount of electromagnetic energy equal to the energy difference involved in the transfer. It is significant that the frequency of this radiation is directly proportional to the energy difference.

For purposes of explanations, this invention will be described hereinbelow with reference to the helium metastable magnetometer, although it is not so limited but can be used generally with optical absorption magnetometers. Helium is of particular interest in magnetometry because it has atomic excitation states in which the energy differences are particularly suitable for measurement with the aid of recently developed optical pumping methods. In a helium metastable magnetometer the energy necessary to add to the system to cause the atom to rise from the ground state $E_o$ to the highest energized state $E_1$ is $E_1-E_o 32\ h\nu$ where $h$ is Planck's constant and $\nu$ is the frequency of an activating or energizing light added to the system. This corresponds to the 1.08 micron (10,800 angstrom) line of helium. In falling from the excited state $E$. to the metastable state $E_{om}$, the atom is "depumped" and radiates a quantity of light energy equivalent to $E_1-E_{om}$. This light, which represents one of the Zeeman lines of helium, is radiated and lost to the system. Insofar as magnetometry is concerned, it is the remaining energy difference, representing the energy retained in the metastable state $E_{om}$ as compared to the ground state $E_o$, that is significant. It is this energy difference which corresponds to the difference between two Zeeman states of helium and is directly proportional to the magnetic field strength. It is only necessary to measure this energy difference to evaluate the magnetic field.

A helium metastable magnetometer logically divides into several separate units; a helium absorption cell, a light source for excitation radiation, a depumping control oscillator, an excitation light detector and an associated signal amplifier. In operation, the light source provides light emitted at the excitation frequency of helium which is contained in the helium absorption cell. The depumping oscillator controls the release of helium atoms from the metastable to the ground state. The frequency of this oscillator when adjusted to obtain a maximum "depumping" signal is a measure of the resonance frequency of the metastable state and hence of the average strength of the magnetic field. It should be noted that the frequency of the resonance radiation of the metastable state of helium is not measured directly but indirectly by observing the effectiveness of the depumping oscillator in producing stimulated radiation in that state. The effectiveness is measured by the increase in absorption in the absorption cell of light from the light source after release from the metastable state takes place. The detection of depumping, and thus the precise adjustment of the depumping oscillator frequency is accomplished by the light detector. Each controlled depumping operation is associated with the release of a large quantity of helium atoms from the stored or optically pumped metastable state to the stable state. At each depumping operation the number of atoms in the stable state and hence available for absorption of light at the excitation frequency from the exciter beam abruptly increases. The depumping is, therefore, associated with a decrease in intensity of the beam from the light source leaving the absorption cell and picked up by the detector. Lead sulfide cells are suitable for use as the detector. The small electrical signals developed in the detector by changes in the exciter beam intensity are then amplified to a useful level and applied to the control circuits including the signal amplifier. In order to measure the depumping frequency, the frequency of the oscillator is caused to seek the frequency at which maximum depumping occurs and actually to sweep back and forth across a median frequency as it hunts the frequency of maximum depumping.

Both the excitation lamp and the absorption cell comprise closed vessels containing pure helium. The lamp is electrically driven at a high frequency to excite the helium in the lamp, causing it to radiate. Likewise, the absorption cell is electrically energized at a high frequency to produce atoms in the metastable state.

The helium excitation lamp forms a part of a tuned circuit; however, since the capacitance introduced into that circuit by the lamp varies when the lamp is not ignited and when it is ignited, the resonance frequency of the circuit is different under these two conditions. Therefore, if the excitation lamp circuit is tuned for maximum lamp brightness, which is desirable to get a maximum signal from the magnetometer, it is then off resonance when the lamp is not ignited, and so more power is required to ignite the lamp. By way of example, if the lamp circuit resonates at a frequency in the order of 31 MegaHertz when the lamp is not fired, then it might be resonant at a frequency of about 28 MegaHertz when the lamp is fired. Since the majority of the time of interest is spent with the lamp operating, heretofore it has been the general practice to adjust the lamp circuit for resonance under operation conditions, such as about 28 MegaHertz Accordingly, when the lamp is not ignited, its circuit is not at resonance, and it is therefore necessary to apply a high voltage to the lamp when it is desired to initially start it. The high voltage utilized to start the lamp occasionally damages other electronic components within the magnetometer system, and even then, many times the lamp does not start readily.

Optimum operation of the helium absorption cell occurs at a frequency that is different from the excitation lamp resonance frequency, both when the lamp is ignited and when the lamp is not ignited. It is desirable, however, to utilize a single power supply to drive both the helium excitation lamp and the helium absorption cello Thus, again it has heretofore been accepted to operate one of these components at its optimum frequency while accepting less than optimum operation of the other component.

Determination of the ambient magnetic field is made by observing changes in the optical detector output. Since theses changes are a relatively small percentage of the detector output, if the output is low then the changes are more difficult to measure. It is accordingly desirable to increase the detector output so that each percentage change is more readily observable. As has been stated, one method of increasing the amount of radiation reaching the detector is to operate the helium excitation lamp at its optimum frequency. Even when operating at this frequency, however, small deviations are difficult to detect. It is accordingly desirable to increase the amount of radiation from the excitation lamp which traverses the path through the absorption cell to the radiation detector.

The present invention is an optical magnetometer system in which the excitation lamp and the absorption cell are driven from a single variable frequency high-frequency source. The absorption cell is coupled to the high-frequency source in a first tuned circuit; while the excitation lamp is connected to the high-frequency source in a second tuned circuit. By means of these two tuned circuits and the variable frequency high-frequency source both the excitation lamp and the absorption cell can be operated at their optimum frequency. Since high-frequency source is a variable frequency source, the frequency of its output excitation can be adjusted for optimum conditions, both before the excitation lamp is ignited and after it is ignited. It is, therefore, possible to operate the magnetometer with the optimum excitation lamp conditions, while being able to ignite the lamp without the necessity of applying a high-voltage pulse to it.

The excitation lamp assembly includes a mirror on the side of the lamp opposite the absorption cell to increase the amount of radiation directed through the absorption cell. Accordingly, the radiation detector output is substantially increased, and deviations in this output, even though a small percentage of the total output, are more readily observed.

These and other aspects and advantages of the present invention are apparent in the following detailed description and claims, particularly when considered in conjunction with the accompanying drawings, in which like parts bear like reference numerals. In the drawings:

FIG. 2 is a diagram, partially in block form and partially schematic, depicting an optical magnetometer incorporating the present invention;

FIG. 4 is an elevational view of the excitation lamp assembly utilized in the present invention;

FIG. 5 is a view taken along line 5—5 of FIG. 4; and

FIG. 6 is a view taken along line 6—6 of FIG. 4.

Figure 1:
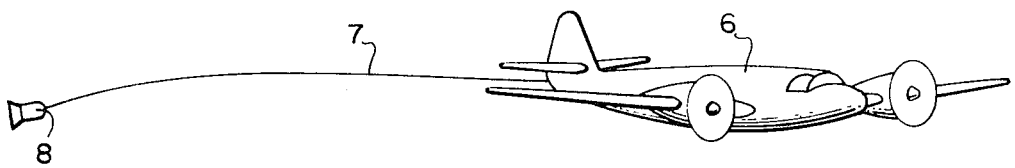
FIG. 1 is a representation of an airborne geophysical prospecting operation.

FIG. 1 depicts a typical airborne geophysical exploration operation. An airplane 6 is flown over an area of interest. Extending from the rear of the airplane 6 is a tow cable 7 which tows an airborne body or "bird" 8 at a considerable distance behind airplane 6. The radiation equipment forming a part of the optically pumped magnetometer is within bird 8 and is coupled to electronic equipment within airplane 6 by means of coaxial cables included within tow cable 7. Often a single airplane such as airplane 6 will tow two birds 8 on separate cables with a magnetometer in each bird.

Referring now to FIG. 2, helium magnetometer unit 10 is shown for purposes of illustration, although it is clear this invention can be used, for example, with alkali-vapor magnetometers such as the sodium, rubidium and cesium magnetometers. The unit 10 generally includes radiation source 12, circular polarizing filter 14, radiation absorption cell 16, and radiation detector unit 20 all located within bird 8. Radiation from source 12 passes into absorption cell 16, and radiation passing out of cell 16 is detected by detector 20. Helium atoms in cell 16 which have been raised to abnormal distributions in the Zeeman sublevels of the metastable state are depumped and released to the more highly absorbing normal distributions, by a high-frequency magnetic field signal supplied through a depumping coil 22 from an oscillator in a manner known to the art. The depumping is, therefore, associated with a decrease in the intensity of the radiation beam reaching detector 20. Detector 20 produces an electrical signal corresponding to the intensity of the radiation beam passed through cell 16 which signal is then used to control the depumping frequency to obtain maximum depumping or absorption of light.

The radiation absorption cell 16 comprises a closed cylindrical vessel containing spectroscopically pure helium gas at a pressure, e.g., 1 to 100 mm. of mercury, such that the metastable helium atoms produced in the discharge have sufficient lifetime to permit an alignment. The helium in the cell is excited to produce atoms in the metastable state by, for example, a high-frequency electric field, produced in the vessel by electrodes 18 fitted at each end of the vessel and coupled to a variable radiofrequency source 24. The cylindrical vessel is fabricated from a material such as glass which is transparent to the helium resonance radiation. If desired, the vessel may be constructed of an opaque material and be provided with windows transparent to the resonance radiation. The absorption cell may be of any arbitrary shape, however, the preferred shape is that of the cylinder as shown.

The radiation source 12 includes a discharge tube similar in operation to the absorption cell 16. The source 12 is also electrically driven by variable radiofrequency source 24. Excitation source 12 radiates unpolarized radiation; however, the portion traveling along the optical path through absorption cell 16 is circularly polarized by circularly polarizing filter 14.

Radiation detector 20 which monitors the resonance radiation passing out of the absorption cell 16 can be any of several such devices sensitive to the resonance radiation. Suitable devices include lead sulfide detectors and phototubes.

The electrical signal output of the detector 20 is passed by coaxial cable 26 to a detector signal amplifier 32 where it is filtered to pass only the fundamental sweep frequency component. Coaxial cable 26 is included within tow cable 7.

The output of amplifier 32 is applied to a phase-controlled rectifier 34 which develops an error signal used to control the frequency of the depumping oscillator 36 which has its output applied by cable 37 to depumping coil 22. Cable 37 is also within tow cable 7. The phase reference voltage required for the phase-controlled rectifier 34 is derived from the timing circuit of frequency meter 38 which measures the frequency of the depumping oscillator 36.

Oscillator 36 applies a high-frequency magnetic field depumping signal to cell 16 through depumping coil 22. The depumping frequency applied to the absorption cell through coil 22 controls release of the helium atoms from the abnormal distribution in the Zeeman levels of the metastable state. This frequency is adjusted until the fundamental component of the sweep rate frequency in the output of detector 20 is reduced to zero. In order to determine the frequency at which maximum depumping occurs, the frequency of oscillator 36 is controlled, first by a signal from the phase-controlled rectifier 34, and second by a signal from sweep former 42. As mentioned, the error signal output of phase-controlled rectifier 34 is dependent upon the output signal of detector 20, as filtered by detector amplifier 32, and upon the phase reference voltage obtained from frequency meter 38. The output of sweep former 42 causes the frequency of depumping oscillator 36 to periodically sweep through a limited range, and the frequency is observed at which maximum depumping occurs in absorption cell 16, as measured by detector 20. This frequency is the desired indication of the magnetic field strength.

The sweep signal produced by sweep former 42 is preferably a square wave, but it can be of any desired shape such as a triangular wave or a sine wave, for example. Preferably the sweep wave should be symmetrical about its zero axis. It is only necessary to move the depumping oscillator frequency both above and below the proper frequency corresponding to the ambient magnetic field in order that the point of maximum radiation absorption in the absorption cell 16 may be sensed as evidenced by output from the phase detector 34. It is preferred to use a signal derived from the clock within frequency meter 38 to control the sweep frequency applied to the depumping oscillator 36. This permits measurement of the depumping frequency over an integral number of periods of sweep. When the sweep signal is not keyed to the frequency measuring intervals but started at any point in time and the depumping frequency measured over a period of time, the measurement does not necessarily include an integral number of sweep cycles, and an error can develop in the measurement. Electronic components 32 to 42 and variable radiofrequency source 24 are all within airplane 6.

Variable frequency radiofrequency source 24 is coupled by coaxial cable 44 inductively to a first tuned circuit 45 which includes coil 46 and capacitor 48. Cable 44 is within tow cable 7. Tuned circuit 45 is connected across the electrodes 18 of radiation absorption cell 16. The radiofrequency excitation from cable 44 is also connected directly to a second tuned circuit 49 made up of coil 50 and capacitor 52. Tuned circuit 49 drives radiation source 12. Circuit 49 is inductively coupled to circuit 45.

Figure 3:
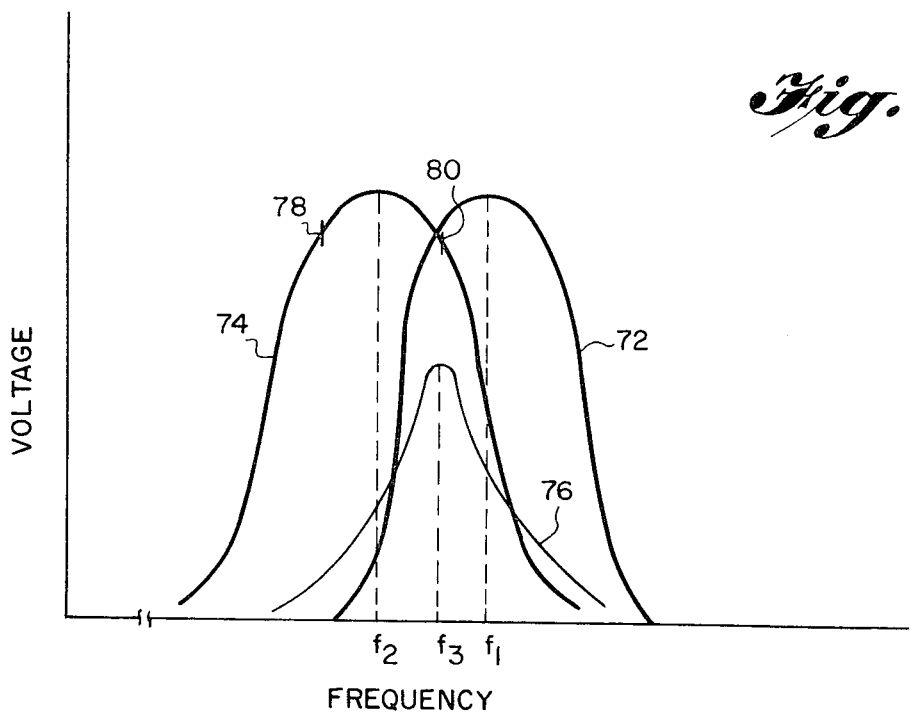
FIG. 3 is a graph utilized in explaining the present invention.

Radiation source 12 acts as a capacitor in parallel with capacitor 52 and inductance coil 50; however, the capacitance of source 12 is different when the source is energized and when the source is not energized. Consequently, the resonant frequency of tuned circuit 49, including coil 50, capacitor 52 and the capacitance of source 12, depends upon whether source 12 is energized or not. Curve 72 in FIG. 3 depicts the resonant curve of circuit 49 when the source 12 is not energized. As there depicted, circuit 49 is resonant about a frequency $f1$, which, for example, might be a frequency in the order of about 31 MegaHertz. When source 12 is energized, the resonant frequency of circuit 49 decreases to a frequency of $f2$, which, for example, might be a frequency in the order of about 28 MegaHertz. Curve 74 in FIG. 3 depicts the resonant curve of circuit 49 when source 12 is energized. Absorption cell 16 likewise acts as a capacitor in parallel with capacitor 48 and inductance coil 46 in tuned circuit 45. The resonant curve of circuit 45 is depicted in FIG. 3 as curve 76, and as there shown is resonant about a frequency $f3$, which, for example, might be a frequency in the order of about 29 MegaHertz. The capacitance of absorption cell 16 is quite low, and so its variation when cell 16 is energized or not energized does not appreciably affect the resonant frequency of circuit 45.

When magnetometer 10 is manufactured, the components within tuned circuits 45 and 49 are selected so that frequency $f2$ falls on the low-frequency slope of the resonant curve 76 for tuned circuit 45. Due to the loading of circuit 49, its resonant curves 72 and 74 have fairly flat peaks. It has been found that optimum operation of absorption cell 16 takes place at a frequency below the resonant frequency $f3$ of tuned circuit 45; that is, optimum operation is not at the frequency of maximum absorption cell brightness. Thus, the components within circuits 45 and 49 are selected so that optimum operation of the absorption cell 16 occurs at a frequency close to the resonant frequency $f2$ which circuit 49 has when excitation source 12 is energized.

When it is desired to start operation of magnetometer 10, variable frequency radiofrequency excitation source 24 is adjusted to supply excitation at frequency $f1$, the resonant frequency of circuit 49 when source 12 is not energized. At this frequency source 12 is readily energized, and then the resonant frequency of circuit 49 changes to frequency $f2$. Accordingly, variable frequency radiofrequency excitation source 24 is then adjusted to provide excitation at this new resonant frequency $f2$ which permits both maximum radiation source brightness and good absorption cell operation. Accordingly, both optimum start up and optimum operation frequencies are provided for the magnetometer. Small changes in frequency of the excitation from source 24 can be made to give optimum magnetometer sensitivity at a frequency near the excitation lamp maximum brightness frequency $f2$. Due to the relative flatness of resonant curve 74, such small frequency changes do not appreciably affect the excitation lamp brightness, but they permit the absorption cell sensitivity to be optimized. These small frequency changes, for example, might be within a range between points 78 and 80 on curve 74 such that the source 12 brightness remains with ±10 percent of its maximum which occurs at frequency $f2$. Within this range the operating frequency can be swept over the low-frequency slope of curve 76 to find the point of optimum magnetometer sensitivity. While the reduction in source 12 brightness reduces the absorption cell 16 output within the ±10 percent range, the absorption cell operation improves by a greater amount, thereby more than compensating for this reduction.

Details of the construction of radiation source 12 are depicted in FIGS. 4, 5 and 6. A radiation lamp in the form of an elongated, hollow cylindrical tube 60, of, for example, glass, and containing helium, has electrodes 62 and 64 at each end for connection across tuned circuit 49. Electrode 62 comprises a metallic band of, for example, brass which clamps tube 60 to a mounting plate 66 which, for example, might be of aluminum. Electrode 64 is a metallic band encircling the opposite end of tube 60 but not contacting plate 66.

When the magnetometer is assembled, mounting plate 66 is exposed to outside air for cooling and forms an external end of the magnetometer assembly. Outer surface 67 of plate 66 accordingly is a curved surface having a diameter equal to that of the assembly, and plate 66 thus acts as a heat sink for the excitation lamp. Electrode band 62, which provides good thermal contact between lamp 60 and plate 66, also provides electrical contact to plate 66 for the grounded end of lamp 60. This heat sink prevents damage to components of the magnetometer which otherwise would result from high temperature.

Mounting plate 66 includes a cylindrical parabolic recess 68 behind tube 60. As can be seen from FIG. 6, in the dimension transverse the longitudinal axis of tube 60 recess 68 has a parabolic cross section. However, as can be seen in FIG. 5, along its other axis the cross section of recess 68 is rectangular. Within recess 68 and on the side of tube 60 opposite absorption cell 16 is located a cylindrical parabolic reflector or mirror 70 of a highly polished material. Mirror 70 likewise has a parabolic cross section along one axis and a rectangular cross section along the other, and the focal line of the parabolic curve of mirror 70, defined by the locus of the parabolae focal points, is susbtantially coincident with the longitudinal axis of tube 60.

When source 12 is ignited by applying excitation from tuned circuit 49 to electrodes 62 and 64, light radiates from the source through absorption cell 16. The light from source 12 which is initially radiated away from cell 16 strikes mirror 70 and is reflected to cell 16. Because mirror 70 has a parabolic cross section, the light striking it is reflected in a path substantially parallel to the longitudinal axis of absorption cell 16. As a result, it has been found that by use of mirror 70, substantially all of the light from source 12 passes to cell 16 without the use of a focusing lens. While any highly reflecting surface could be suitable on mirror 70, best operation has been found when the reflecting surface of mirror 70 is gold. The entire magnetometer system must, of course, be free from any materials, such as nickel, exhibiting magnetic properties.

What is claimed is:

1. In a device for measuring the intensity of minute magnetic fields with an optical magnetometer having a source for the emission of resonance radiation, a radiation cell having radiation emitted from said source directed therethrough to produce alignment of atoms in said cell, means to produce an alternating magnetic field in said cell of a frequency which diminishes the alignment of said atoms, and detector means for producing an output proportional to the intensity of impinging radiation from said source which passes through said cell, the improvement comprising:

a source of high-frequency excitation including frequency adjustment means and capable of providing excitation at any preset frequency within a limited frequency range;

first coupling means for coupling said source of high-frequency excitation to said radiation cell in a first tuned circuit having a first resonant frequency within the limited frequency range to energize said radiation cell; and second coupling means for coupling said source of high-frequency excitation to said resonance radiation source in a second tuned circuit to energize said resonance radiation source, said second tuned circuit having when said resonance radiation source is deenergized a second resonant frequency within the limited frequency range and having when said resonance radiation source is energized a third resonant frequency within the limited frequency range, with the first resonant frequency being between the second resonant frequency and the third resonant frequency.

2. The improvement of claim 1 further comprising radiation reflection means within the radiation source and on the side of the radiation lamp opposite the absorption cell for reflecting to the absorption cell radiation from the lamp initially radiated away from the absorption cell.

3. The improvement of claim 2 in which the radiation reflection means comprises a cylindrical parabolic mirror.

4. The improvement of claim 3 in which the radiation lamp comprises an elongated tube and in which the radiation reflection means comprises a cylindrical parabolic mirror having a focal line substantially coincident with the longitudinal axis of the elongated tube.

5. The improvement of claim 4 in which the radiation source further includes a metallic plate with a curved surface forming an exterior surface of the magnetometer for acting as a heat sink for the radiation lamp.

6. A method of operating an optically pumped magnetometer including a source of high-frequency excitation having frequency adjustment means and capable of providing excitation at any preset frequency within a limited frequency range, a resonance radiation source coupled to said source of high-frequency excitation in a resonant circuit having a resonant frequency $f1$ within the limited frequency range when said radiation source is deenergized and having a resonant frequency $f2$ within the limited frequency range when said radiation source is energized, a radiation absorption cell on one side of the radiation source for passage therethrough of radiation from the source to produce alignment of atoms therein, a radiation detector for detection of radiation passing out of the absorption cell, and means for subjecting the absorption cell to a high-frequency magnetic field to diminish the alignment of atoms therein, said method comprising adjusting the source of high-frequency excitation to frequency $f1$, supplying excitation from said source of high-frequency excitation to said radiation source and to said absorption cell to initiate operation of the magnetometer, adjusting the source of high-frequency excitation to frequency $f2$, and supplying excitation from said excitation source to said radiation source and to said absorption cell to maintain operation of the magnetometer.

7. A method as claimed in claim 6 further comprising subsequently changing the excitation from said excitation source to a frequency within a range which retains the output from said radiation source within 10 percent of its maximum value to cause optimum sensitivity of said absorption cell.

8. An optically pumped magnetometer comprising a source of high-frequency excitation including frequency adjustment means and capable of providing excitation at any preset frequency within a limited frequency range; a resonance radiation source including a radiation lamp; first coupling means for coupling the source of high-frequency excitation to the resonance radiation source in a first tuned circuit to energize the resonance radiation source, the first tuned circuit having when the resonance radiation source is deenergized a first resonant frequency within the limited frequency range and having when the resonance radiation source is energized a second resonant frequency within the limited frequency range; a radiation absorption cell on one side of the radiation source for passage therethrough of radiation from the source to produce alignment of atoms therein; second coupling means for coupling the source OF HIGH-frequency excitation to the radiation absorption cell in a second tuned circuit having a third resonant frequency between the first resonant frequency and the second resonant frequency to energize the radiation absorption cell; a radiation detector for detection of radiation passing out the absorption cell to produce an output proportional to the intensity of impinging radiation from the source which passes through the cell; and means to produce an alternating magnetic field in the absorption cell to diminish the alignment of atoms therein.

9. A magnetometer as claimed in claim 8 in which the radiation source includes radiation reflection means on the side of the radiation lamp opposite the absorption cell for reflecting to the absorption cell radiation from the lamp initially radiated away from the absorption cell.

10. A magnetometer as claimed in claim 9 in which the radiation lamp comprises an elongated tube in which the radiation reflection means comprises a cylindrical parabolic mirror having a focal line substantially coincident with the longitudinal axis of the elongate tube.

11. A magnetometer as claimed in claim 9 in which the radiation source further includes a metallic plate with a curved surface forming an exterior surface of the magnetometer for acting as a heat sink for the radiation lamp.

* * * * *